United States Patent
Chen et al.

(10) Patent No.: US 11,303,218 B2
(45) Date of Patent: Apr. 12, 2022

(54) LOW DELAY TIME POWER CONVERTER CIRCUIT AND DRIVER CIRCUIT THEREOF

(71) Applicant: Richtek Technology Corporation, Zhubei (TW)

(72) Inventors: Isaac Y. Chen, Hsinchu (TW); Chien-Fu Tang, Hsinchu (TW); Jo-Yu Wang, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 128 days.

(21) Appl. No.: 16/926,726

(22) Filed: Jul. 12, 2020

(65) Prior Publication Data
    US 2021/0167691 A1    Jun. 3, 2021

(30) Foreign Application Priority Data
    Dec. 3, 2019  (TW) ................... 108144188

(51) Int. Cl.
    *H02M 3/335*    (2006.01)
    *H02M 1/08*    (2006.01)

(52) U.S. Cl.
    CPC ......... *H02M 3/33592* (2013.01); *H02M 1/08* (2013.01)

(58) Field of Classification Search
    CPC ...... H02M 3/33592; H02M 1/08; H02M 1/38; H02M 3/1588; Y02B 70/10
    See application file for complete search history.

(56) References Cited

U.S. PATENT DOCUMENTS

| | | | |
|---|---|---|---|
| 11,095,282 B2* | 8/2021 | Balaz | H02M 1/08 |
| 2013/0278301 A1* | 10/2013 | Huynh | H02H 9/046 |
| | | | 327/110 |

FOREIGN PATENT DOCUMENTS

TW    201735512 A    10/2017

* cited by examiner

*Primary Examiner* — Kyle J Moody
(74) *Attorney, Agent, or Firm* — Tung & Associates

(57) ABSTRACT

A low delay time power converter circuit includes a driver circuit and a load. The driver circuit generates a switching driving signal to control the load. The driver circuit includes a switching control circuit and an output stage circuit which includes a first power switch, a second power switch and an impedance adjusting circuit. When the switching control circuit controls the switching driving signal to a first voltage level at a first time point, the first power switch is turned ON and then is turned OFF after a predetermined period. When the switching control circuit controls the switching driving signal to a second voltage level at a second time point, the second power switch is turned ON. The time point when the first power switch is turned OFF is earlier than the second time point. A resistance of the impedance adjusting circuit is larger than a conductive resistance of the first power switch.

32 Claims, 11 Drawing Sheets

LOW DELAY TIME POWER CONVERTER CIRCUIT AND DRIVER CIRCUIT THEREOF

CROSS REFERENCE

The present invention claims priority to TW 108144188, filed on Dec. 3, 2019.

BACKGROUND OF THE INVENTION

Field of Invention

The present invention relates to a power converter circuit, particularly to a power converter circuit which has low delay time. The present invention also relates to a driver circuit for use in the power converter circuit.

Description of Related Art

FIG. 1A shows a prior art power converter circuit (power converter circuit 1). The power converter circuit 1 includes a driver circuit 500 and a load 600. The driver circuit 500 including a switching control circuit 50 and an output stage circuit 60 is configured to operably drive the load 600. The switching control circuit 50 controls the output stage circuit 60 according to a switching control signal S0' to generate a switching driving signal SG' at an output node N'. The output stage circuit 60 includes a power switch SW_U and a power switch SW_D, wherein the power switch SW_U is coupled between a power source V5 and the output node N', and the power switch SW_D is coupled between a power source V6 and the output node N'. FIG. 1B shows operation waveforms corresponding to FIG. 1A. The power source V5 is at high level and the power source V6 is at low level. When the switching control signal S0' controls the switching driving signal SG' to the high level (e.g. time point t5 in FIG. 1B), the switching control circuit 50 is turned ON the power switch SW_U by a switching control signal CTL_U, and is turned OFF the power switch SW_D by a switching control signal CTL_D; when the switching control signal S0' controls the switching driving signal SG' to the low level (e.g. time point t6 in FIG. 1B), the switching control circuit 50 is turned ON the power switch SW_D, and is turned OFF the power switch SW_U. In order to avoid "shoot-through" occurring when the power switch SW_U and the power switch SW_D are both conductive at the same time, the power switch SW_D is turned OFF at time point t5 and then after a dead time (as shown Td in FIG. 1B) the power switch SW_U is turned ON; the power switch SW_U is turned OFF at time point t6 and then after the dead time point td the power switch SW_U is turned ON.

FIG. 2A shows another prior art power converter circuit (power converter circuit 2). As shown in FIG. 2A, a switching control signal CTL_Q' controls a bipolar junction transistor (BJT) Q', and a switching control signal CTL_D" controls a power switch SW_D"; the switching control signal CTL_Q' is controlled by a power switch SW_U' and a power switch SW_D', wherein the power switch SW_U' is controlled by a switching control signal CTL_U', and the power switch SW_D' is controlled by a switching control signal CTL_D'. Similar to the prior art of FIG. 1A, when the BJT Q' and the power switch SW_D" are both conductive at the same time, undesirable shoot-through occurs; to avoid such shoot-through, the BJT Q' is turned ON after the power switch SW_D" is turned OFF; or the power switch SW_D" is turned ON after the BJT Q' is turned OFF. FIG. 2B shows operation waveforms corresponding to FIG. 2A. Similar to FIG. 1B, dead time is required (as shown by Td1 and Td2 in FIG. 2B) to avoid shoot-through.

Although the prior arts shown in FIG. 1A and FIG. 2A can avoid shoot-through, they have a drawback that there is a delay time from the time point that the switching control signal S0' controls the switching driving signal SG' to switch (e.g. time point t5 or t6 in FIG. 1B) to the time point that the switching driving signal SG' actually switches (e.g. time point t7 or t8 in FIG. 1B), as a result of the dead time (e.g. Td in FIG. 1B or Td1 and Td2 in FIG. 2B). That is, when the switching control signal S0' controls the switching driving signal SG' to switch, the switching driving signal SG' cannot switch immediately; instead, the switching driving signal SG' can switch only after a delay time.

Compared with the prior arts of FIG. 1A and FIG. 2A, the present invention is advantageous in that shoot-through is avoided (or there is only low shoot-through current) without the need to reserve a dead time, which can effectively improve the switching speed.

SUMMARY OF THE INVENTION

From one perspective, the present invention provides a low delay time power converter circuit, comprising: a driver circuit, including a switching control circuit and a first output stage circuit, wherein the switching control circuit is configured to operably control the first output stage circuit according to a switching control signal to generate a first switching driving signal at a first output node, wherein the first output stage circuit includes: a first power switch, coupled between a first power source and the first output node, wherein when the switching control signal switches at a first time point to control the first switching driving signal to change to a first voltage level, the switching control circuit turns ON the first power switch, such that the first switching driving signal switches to the first voltage level, and thereafter the first power switch is turned OFF at a time point after a predetermined period from when the first power switch is turned ON, wherein the first power switch has a first conductive resistance when conductive; a second power switch, coupled between a second power source and the first output node, wherein when the switching control signal switches at a second time point to control the first switching driving signal to change to a second voltage level, the switching control circuit turns ON the second power switch, such that the first switching driving signal switches to the second voltage level; and an impedance adjusting circuit, connected to the first power switch in parallel, wherein when the first switching driving signal is at the first voltage level, the impedance adjusting circuit has a resistance; wherein the time point when the first power switch is turned OFF is earlier than the second time point, and wherein the resistance of the impedance adjusting circuit is larger than the first conductive resistance; and a load, controlled by the first switching driving signal to operate.

In one embodiment, the impedance adjusting circuit includes a first resistor which is coupled between the first power source and the first output node, wherein a resistance of the first resistor is larger than the first conductive resistance.

In one embodiment, the switching control circuit is configured to operably control the impedance adjusting circuit, wherein at the first time point, the switching control circuit controls the impedance adjusting circuit to adjust the first switching driving signal, such that the first switching driving signal switches to the first voltage level, and when the first power switch is turned OFF, the impedance adjusting circuit maintains the first switching driving signal at the first voltage level, and thereafter at the second time point, the switching control circuit controls the impedance adjusting circuit to stop adjusting the first switching driving signal.

In one embodiment, the first power source has the first voltage level, and the second power source has the second voltage level.

In one embodiment, the impedance adjusting circuit includes a third power switch which is coupled between the first power source and the first output node, wherein during a period when the switching control signal controls the first switching driving signal at the first voltage level, the switching control signal turns ON the third power switch, and during a period when the switching control signal controls the first switching driving signal at the second voltage level, the switching control signal turns OFF the third power switch; wherein the third power switch has a third conductive resistance when conductive, wherein the third conductive resistance is larger than the first conductive resistance.

In one embodiment, the impedance adjusting circuit further includes: a second resistor, coupled in series with the third power switch between the first power source and the first output node, wherein a resistance of the second resistor is larger than the first conductive resistance; or a current source, coupled in series with the third power switch between the first power source and the first output node, wherein a current level generated by the current source is smaller than a current level through the first power switch.

In one embodiment, the first power switch, the second power switch and the third power switch are NMOS (N-type metal oxide semiconductor) transistors.

In one embodiment, the first power switch and the third power switch are PMOS (P-type metal oxide semiconductor) transistors, and the second power switch is an NMOS transistor.

In one embodiment, the driver circuit further includes a second output stage circuit which is coupled between the first output stage circuit and the first output node, wherein the first output stage circuit generates a second switching driving signal at a second output node according to the switching control signal, wherein the first power switch is coupled between the first power source and the second output node, and the second power switch is coupled between the second power source and the second output node, wherein the second output stage circuit generates the first switching driving signal at the first output node according to the second switching driving signal, wherein the second output stage circuit includes: a bipolar junction transistor (BJT), wherein a base of the BJT is coupled to the second output node, an emitter of the BJT is coupled to the first output node, and a collector of the BJT is coupled to a third power source, wherein the BJT generates an emitter current through the emitter according to a base current through the base, wherein the second switching driving signal corresponds to the base current, wherein the emitter current is at a first current level when the first power switch is conductive, and the emitter current is at a second current level when the first power switch is non-conductive and the third power switch is conductive, wherein the second current level is smaller than the first current level, wherein when the switching control signal switches at the first time point to control the first switching driving signal to change to the first voltage level, the second switching driving signal turns ON the BJT, such that the first switching driving signal switches to the first voltage level; and a fourth power switch, coupled between the first output node and a fourth power source, wherein when the switching control signal switches at the second time point to control the first switching driving signal to change to the second voltage level, the switching control circuit turns ON the fourth power switch, such that the first switching driving signal switches to the second voltage level.

In one embodiment, the first power switch, the second power switch and the third power switch are NMOS transistor.

In one embodiment, the first power switch and the third power switch are PMOS transistor, and the second power switch is an NMOS transistor.

In one embodiment, the fourth power switch is an NMOS transistor.

In one embodiment, the third power source has the first voltage level and the fourth power source has the second voltage level.

In one embodiment, the first voltage level is larger than the second voltage level.

In one embodiment, the first voltage level is smaller than the second voltage level.

In one embodiment, the low delay time power converter circuit is configured as a switching power supply circuit, wherein the switching power supply circuit is configured to operably convert an input voltage to an output voltage, wherein the switching power supply circuit includes: an inductor; a conversion switch, configured to operably control the inductor to convert the input voltage to the output voltage; and a conversion control circuit, configured to operably control the conversion switch; wherein the driver circuit corresponds to the conversion control circuit, and the load corresponds to the conversion switch.

In one embodiment, the low delay time power converter circuit is configured as a flyback power converter, wherein the flyback power converter is configured to operably convert an input voltage to a output voltage, wherein the flyback power converter includes: a power transformer, coupled between the input voltage and the output voltage; a primary side switch, coupled to a primary side winding of the power transformer, wherein the primary side winding is coupled to the input voltage; asynchronous rectification switch, coupled to a second side winding of the power transformer; a primary side controller circuit, configured to operably generate a switching signal to control the primary side switch to operate the primary side winding of the power transformer; and a secondary side controller circuit, configured to operably generate a synchronous rectification control signal to control the synchronous rectification switch to operate the secondary side winding of the power transformer to generate the output voltage; wherein the driver circuit is configured as one of the following: wherein the first switching driving signal corresponds to the switching signal, the driver circuit corresponds to the primary side controller circuit, and the load corresponds to the primary side switch; or wherein the first switching driving signal corresponds to the synchronous rectification control signal, the driver circuit corresponds to the secondary side controller circuit, and the load corresponds to the synchronous rectification switch.

In another aspect, the present invention provides a driver circuit configured to operably drive a load, comprising: a first output stage circuit; and a switching control circuit, configured to operably control the first output stage circuit according to a switching control signal to generate a first switching driving signal at a first output node; wherein the first output stage circuit includes: a first power switch, coupled between a first power source and the first output node, wherein when the switching control signal switches at a first time point to control the first switching driving signal to change to a first voltage level, the switching control circuit turns ON the first power switch, such that the first switching driving signal switches to the first voltage level, and thereafter the first power switch is turned OFF at a time point after a predetermined period from when the first power switch is turned ON, wherein the first power switch has a first conductive resistance when conductive; a second power switch, coupled between a second power source and the first output node, wherein when the switching control signal switches at a second time point to control the first switching driving signal to change to a second voltage level, the switching control circuit turns ON the second power switch, such that the first switching driving signal switches to the second voltage level; and an impedance adjusting circuit, connected to the first power switch in parallel, wherein when the first switching driving signal is at the first voltage level, the impedance adjusting circuit has a resistance; wherein the time point when the first power switch is turned OFF is earlier than the second time point, and wherein the resistance of the impedance adjusting circuit is larger than the first conductive resistance.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3A:
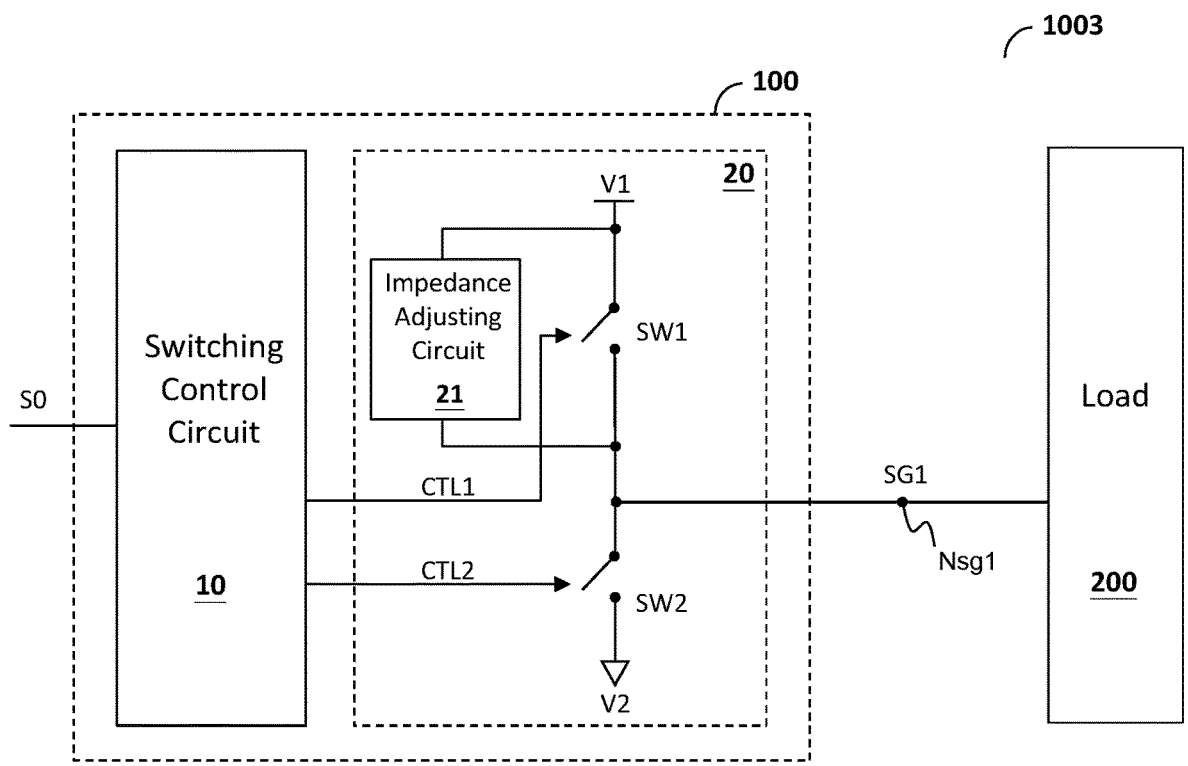
FIG. 3A shows an embodiment of a low delay time power converter circuit according to the present invention.

FIG. 3A shows an embodiment of a low delay time power converter circuit according to the present invention (power converter circuit 1003). In one embodiment as shown in FIG. 3A, power converter circuit 1003 includes a driver circuit 100 and a load 200.

In one embodiment, the driver circuit 100 includes a switching control circuit 10 and an output stage circuit 20. The switching control circuit 10 is configured to operably control the output stage circuit 20 according to a switching control signal S0 to generate a switching driving signal SG1 at an output node Nsg1, to control the load 200. In one embodiment, the load 200 is a capacitive load. In one embodiment, the load 200 is for example a switch to convert power sources. The details will be described later.

In one embodiment, the output stage circuit 20 includes a power switch SW1, a power switch SW2 and an impedance adjusting circuit 21. In one embodiment, the power switch SW1 is coupled between a power source V1 and the output node Nsg1; the power switch SW2 is coupled between a power source V2 and the output node Nsg1; the impedance adjusting circuit 21 is connected to the power switch SW1 in parallel.

Figure 3B:
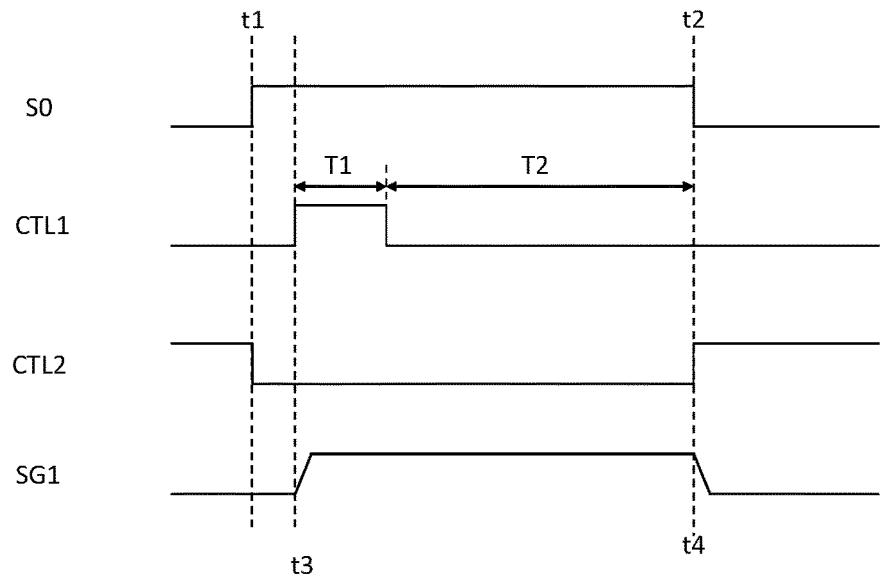
FIG. 3B shows operation waveforms corresponding to FIG. 3A.

Please refer to FIG. 3A together with FIG. 3B. FIG. 3B shows operation waveforms corresponding to FIG. 3A. As shown in FIG. 3A, in one embodiment, the power source V1 is at first voltage level and the power source V2 is at second voltage level, wherein the first voltage level is higher than the second voltage level. In another embodiment, the first voltage level can be smaller than the second voltage level. For convenience, hereinafter all embodiments are given based on the case that the first voltage level is high level and the second voltage level is low level. As shown in FIG. 3B, when the switching control signal S0 switches at time point t1 to control the switching driving signal SG1 to change from low level to high level, the power switch SW1 is turned ON by the switching control circuit 10 via the switching control signal CTL1, whereby the switching driving signal SG1 switches to the high level, and the power switch SW1 is turned OFF after a predetermined period T1; when the switching control signal S0 switches at time point t2 to control the switching driving signal SG1 to change from high level to low level, the power switch SW2 is turned ON by the switching control circuit 10 via the switching control signal CTL2, whereby the switching driving signal SG1 switches to the low level.

In one embodiment, from the time point t1 to the time point t2, the impedance adjusting circuit 21 has a resistance, such that when the power switch SW1 is OFF (e.g. in the period T2 in FIG. 3B), the power source V1 is still electrically connected to the output node Nsg1 by the resistance of the impedance adjusting circuit 21, such that the switching driving signal SG1 keeps at the high level.

When the switching control circuit 10 controls the power switch SW1 to be ON, the power switch SW1 has a conductive resistance OR1. In one embodiment, the resistance of the impedance adjusting circuit 21 is larger than the conductive resistance OR1. In one embodiment, the endpoint of the predetermined period T1 is earlier than the time point t2.

Figure 1A:
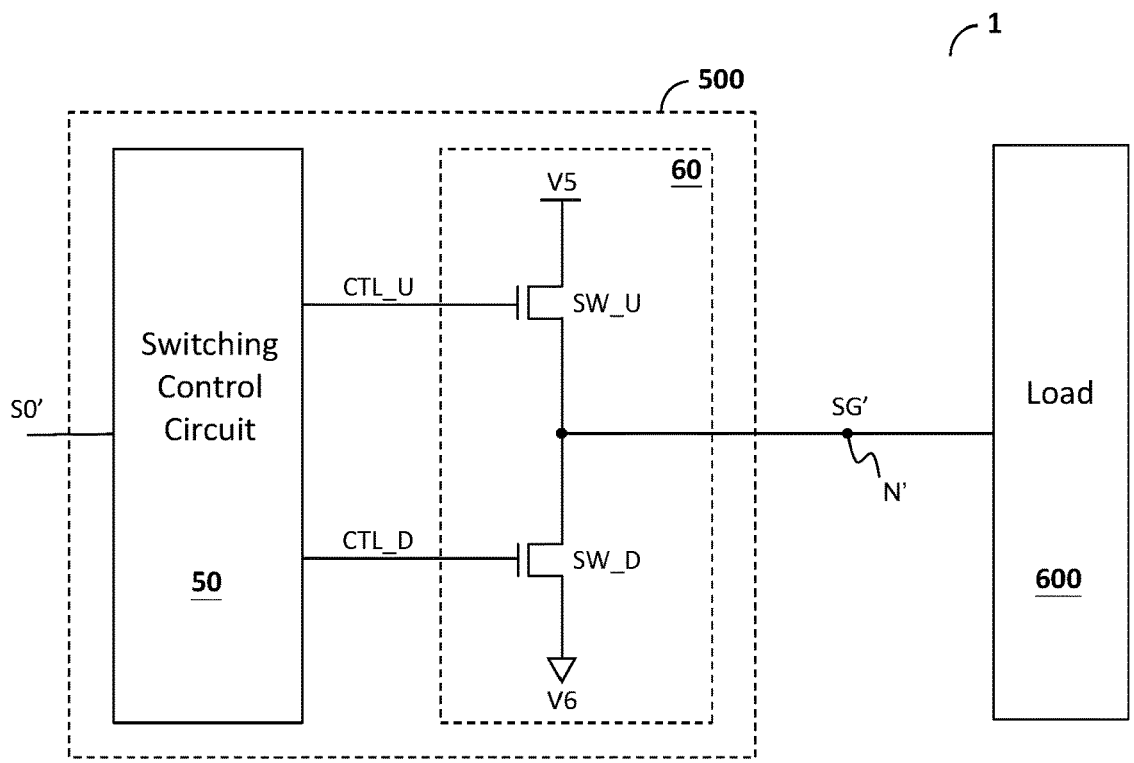
FIG. 1A shows a prior art power converter circuit.
Figure 1B:
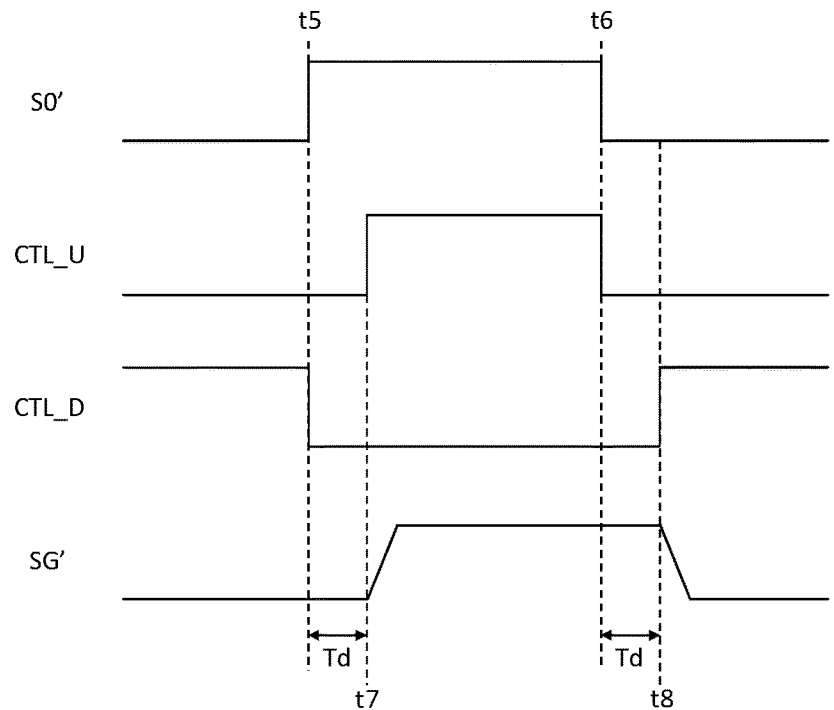
FIG. 1B shows operation waveforms corresponding to FIG. 1A.

Please note that, according to the present invention, because the end point of the predetermined period T1 is earlier than the time point t2, in the period from the end point of the predetermined period T1 to the time point t2 (i.e. the period T2 as shown in FIG. 3B), only the impedance adjusting circuit 21 operates to maintain the level of the switching driving signal SG1. Besides, because the resistance of the impedance adjusting circuit 21 is larger than the conductive resistance OR1, the time point t4 when the switching driving signal SG1 starts switching from the high level to the low level is not restricted by the requirement of the dead time (e.g. the dead time td as shown in FIG. 1B), so that the delay time between the switching of the switching control signal S0 and the switching of the switching driving signal SG1. In one preferred embodiment, the delay time is zero. That is, when the switching control signal S0 switches at the time point t2, in response, the switching driving signal SG1 starts switching to the low level immediately without any delay.

In one embodiment, the endpoint of the predetermined period T1 is earlier than the time point t4. Please note that, the period between the end of the predetermined period T1 and the time point t4 (i.e. the period T2) is different from the dead time of prior arts in spirit. Please refer to FIG. 1A and FIG. 1B, in the prior art, when the switching control signal S0' switches at the time point t6 to change the switching driving signal SG' to low level, the power switch SW_U is turned OFF first, and the power switch SW_D is turned ON after the dead time Td; please note that the power switch SW_U is turned OFF after the switching control signal S0' switches. Compared with the prior arts, in the embodiment of the present invention in FIG. 3A, the power switch SW1 is turned OFF at the end point of the predetermined period T1, and thereafter the switching control signal S0 switches at the time point t2 to change the switching driving signal SG1 to low level, which controls the power switch SW2 to turn ON; please note that the power switch SW1 is turned OFF before the switching control signal S0 switches.

Please note that, in this embodiment, the time point when the switching driving signal SG1 actually switches from high level to low level is improved (i.e. becomes earlier); however, there is still a dead time from the time point t1 to the time point t3 when the switching driving signal SG1 actually switches from low level to high level. Nevertheless, according to the present invention, the ways to remove or improve the delay time in all the embodiments can also be applied to controlling the time point when the switching driving signal SG1 actually switches from low level to high level. That is, either or both the switching time points from low level to high level and/or from high level to low level can be improved according to the spirit of the present invention.

More specifically, the power switch SW1 has been turned OFF before the switching control signal S0 switches at time point t2, so even if there is any current through the impedance adjusting circuit 21 and the power switch SW2 when the switching driving signal SG1 switches from high level to low level (i.e. when the switching control circuit 10 turns ON the power switch SW2), the shoot-through current will be within an acceptable range since the resistance of the impedance adjusting circuit 21 is large. As a result, according to the present invention, the time point when the power switch SW2 is turned ON is not restricted by the requirement of dead time, so that the delay time between the switching of the switching control signal S0 and the switching of the switching driving signal SG1 can be significantly reduced.

In one embodiment, the predetermined period T1 is fixed-length. In another embodiment, the length of the predetermined period T1 is variable. In one embodiment, the length of the predetermined period T1 is adaptively adjustable according to the time point t2, as long as the end point of the predetermined period T1 is earlier than the time point t2.

Figure 4:
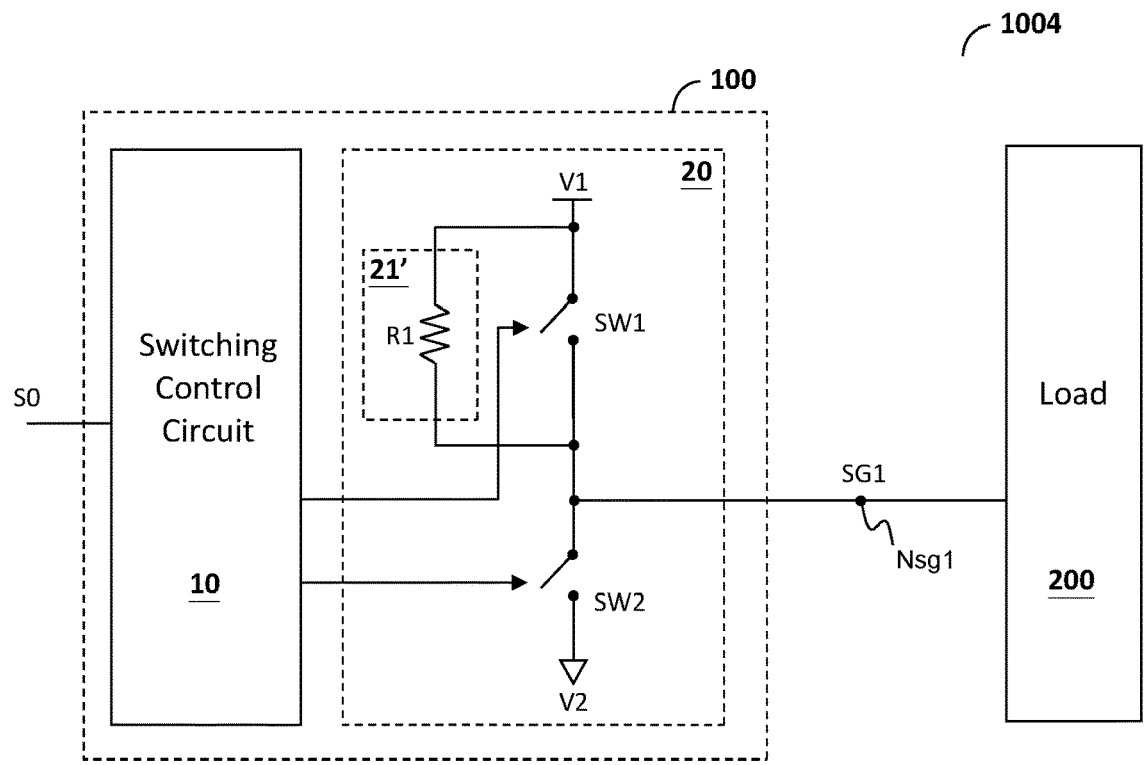
FIG. 4 shows an embodiment of a low delay time power converter circuit according to the present invention.

FIG. 4 shows an embodiment of a low delay time power converter circuit according to the present invention (power converter circuit 1004). In this embodiment, the impedance adjusting circuit 21' includes a resistor R1 which is coupled between the power source V1 and the output node Nsg1. As mentioned in the embodiment of FIG. 3A, the power switch SW1 is turned OFF after a predetermined period T1. Because the end point of the predetermined period T1 is earlier than the time point t2, in the period (i.e. T2 as shown in FIG. 3B) from the end point of the predetermined period T1 to the time point t2, only the resistor R1 operates to maintain the level (e.g. high level) of the switching driving signal SG1. Besides, the resistance of the resistor R1 is larger than the conductive resistance OR1, so that the time point t4 when the switching driving signal SG1 switches from the high level to the low level is not restricted by the requirement of dead time, which can significantly reduce the delay time.

Figure 5:
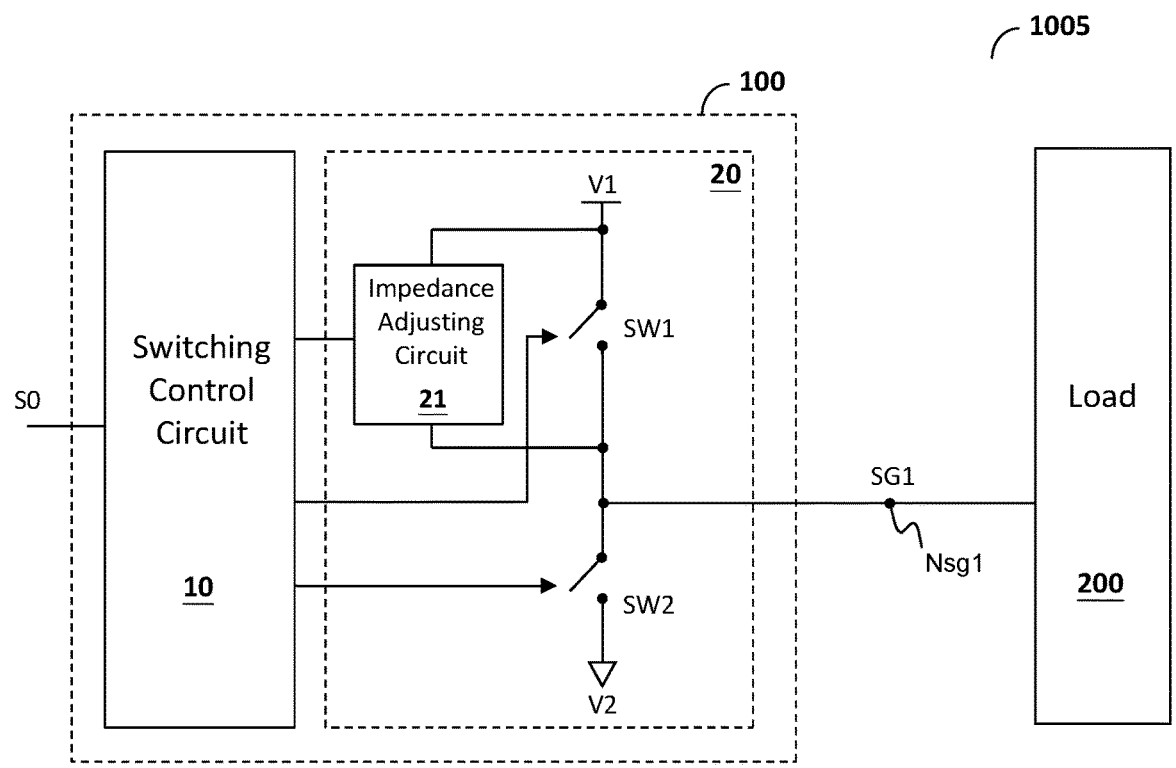
FIG. 5 shows an embodiment of a low delay time power converter circuit according to the present invention.

FIG. 5 shows an embodiment of a low delay time power converter circuit according to the present invention (power converter circuit 1005). In this embodiment, the switching control circuit 10 is configured to operably control the impedance adjusting circuit 21. At the time point t1 (as shown in FIG. 3B), the switching control circuit 10 controls the impedance adjusting circuit 21 to adjust the switching driving signal SG1, such that the switching driving signal SG1 switches to the high level. When the power switch SW1 is turned OFF, the impedance adjusting circuit 21 maintains the switching driving signal SG1 at the high level, and thereafter at the time point t2 (as shown in FIG. 3B), the switching control circuit 10 controls the impedance adjusting circuit 21 to stop adjusting the switching driving signal SG1.

Figure 6A:
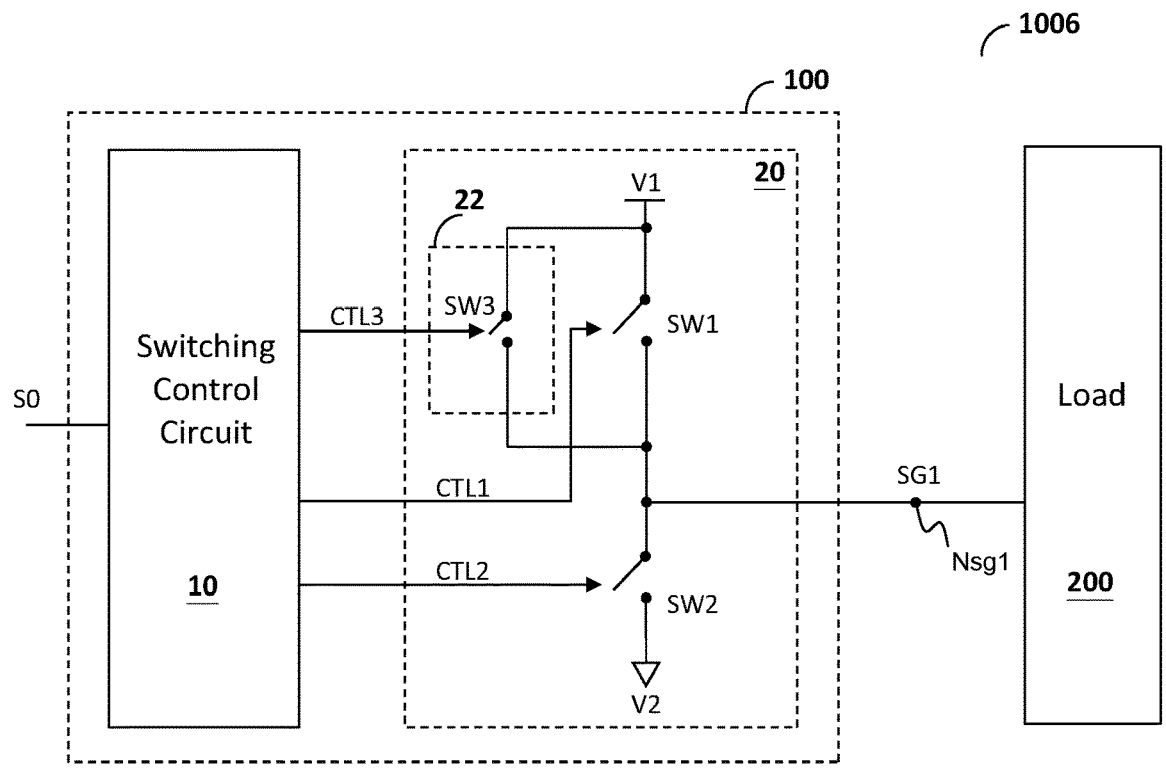
FIG. 6A shows a specific embodiment of an impedance adjusting circuit in a low delay time power converter circuit according to the present invention.
Figure 6B:
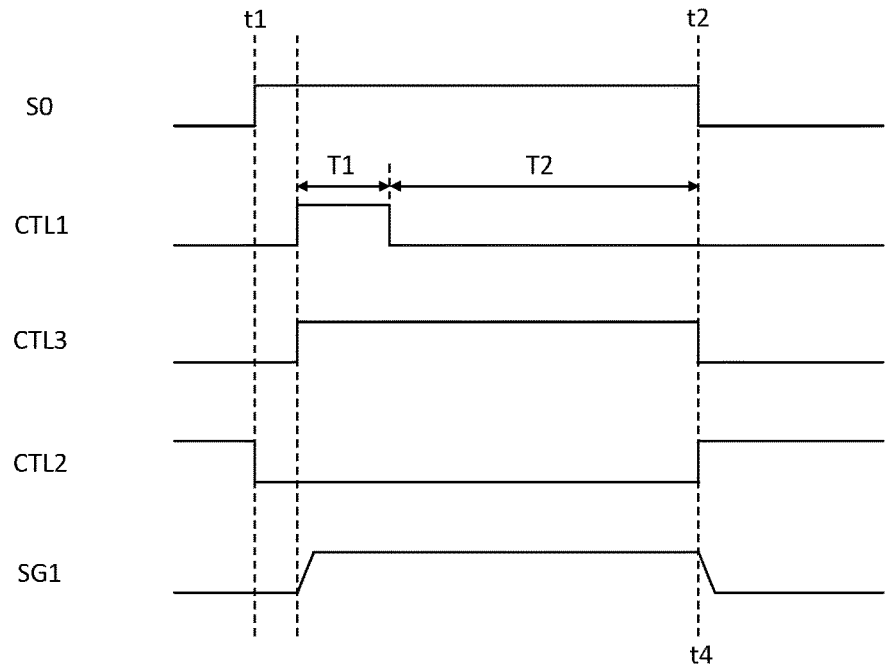
FIG. 6B shows operation waveforms corresponding to FIG. 6A.

Please refer to FIG. 6A together with FIG. 6B. FIG. 6A shows a specific embodiment of an impedance adjusting circuit in a low delay time power converter circuit according to the present invention (power converter circuit 1006). In this embodiment, the impedance adjusting circuit 22 includes a power switch SW3 which is coupled between the power source V1 and the output node Nsg1. When the switching control signal S0 controls the switching driving signal SG1 to the high level, the switching control circuit 10 controls the power switch SW3 (through a switching control signal CTL3) to be ON. When the switching control signal S0 controls the switching driving signal SG1 to the low level, the switching control circuit 10 controls the power switch SW3 (through the switching control signal CTL3) to be OFF. The power switch SW3 has a conductive resistance OR3, wherein the conductive resistance OR3 is larger than the conductive resistance OR1. FIG. 6B shows operation waveforms corresponding to FIG. 6A. The power switch SW1 is turned OFF after the predetermined period T1, wherein the end point of the predetermined period T1 is earlier than the time point t2. In the period (i.e. T2 as shown in FIG. 6B) from the end point of the predetermined period T1 to the time point t2, only the power switch SW3 (which has the conductive resistance OR3) operates to maintain the level of the switching driving signal SG1, and the conductive resistance OR3 is larger than the conductive resistance OR1, so that the time point t4 when the switching driving signal SG1 switches from the high level to the low level is not restricted by the requirement of dead time, which can significantly reduce the delay time.

For example, near the time point t2, even if the power switch SW3 and the power switch SW2 are both conductive, a shoot-through current between the power switch SW3 and the power switch SW2 can be limited by the conductive resistance OR3. As a result, when the switching control signal S0 switches at time point t2, the power switch SW2 can be turned ON immediately without requiring waiting for a dead time, so that the delay time between the switching of the switching control signal S0 and the switching of the switching driving signal SG1 can be significantly reduced.

Figure 7:
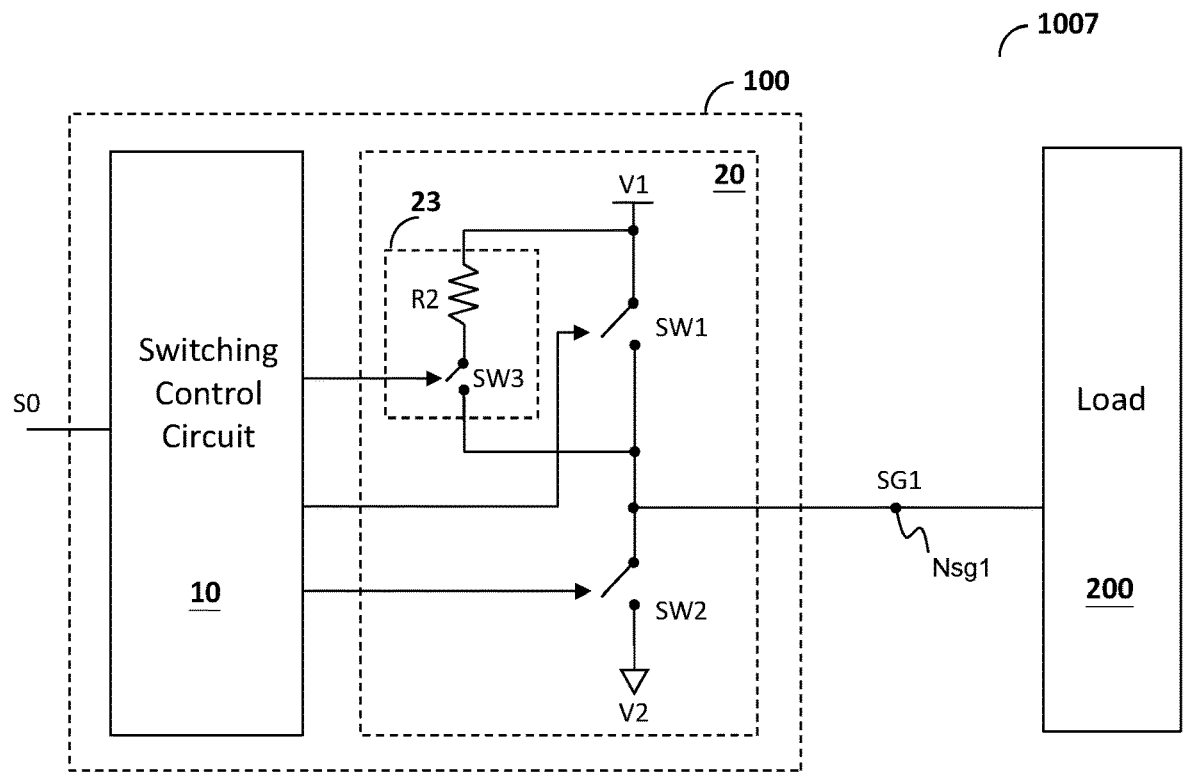
FIG. 7 shows an embodiment of a low delay time power converter circuit according to the present invention.

FIG. 7 shows an embodiment of a low delay time power converter circuit according to the present invention (power converter circuit 1007). In this embodiment, the impedance adjusting circuit 23 includes a resistor R2 and a power switch SW3. The resistor R2 is coupled in series with the power switch SW3 between the power source V1 and the output node Nsg1. Likely as in the embodiment of FIG. 6A, the power switch SW1 is turned OFF after the predetermined period T1. Because the end point of the predetermined period T1 is earlier than the time point t2, in the period (i.e. T2 as shown in FIG. 6B) from the end point of the predetermined period T1 to the time point t2, only the resistor R2 and the power switch SW3 operate to maintain the level of the switching driving signal SG1. Besides, the total resistance of the resistor R2 and the conductive resistance OR3 is larger than the conductive resistance OR1, so that the time point t4 when the switching driving signal SG1 switches from the high level to the low level is not restricted by the requirement of dead time, which can significantly reduce the delay time.

Figure 8:
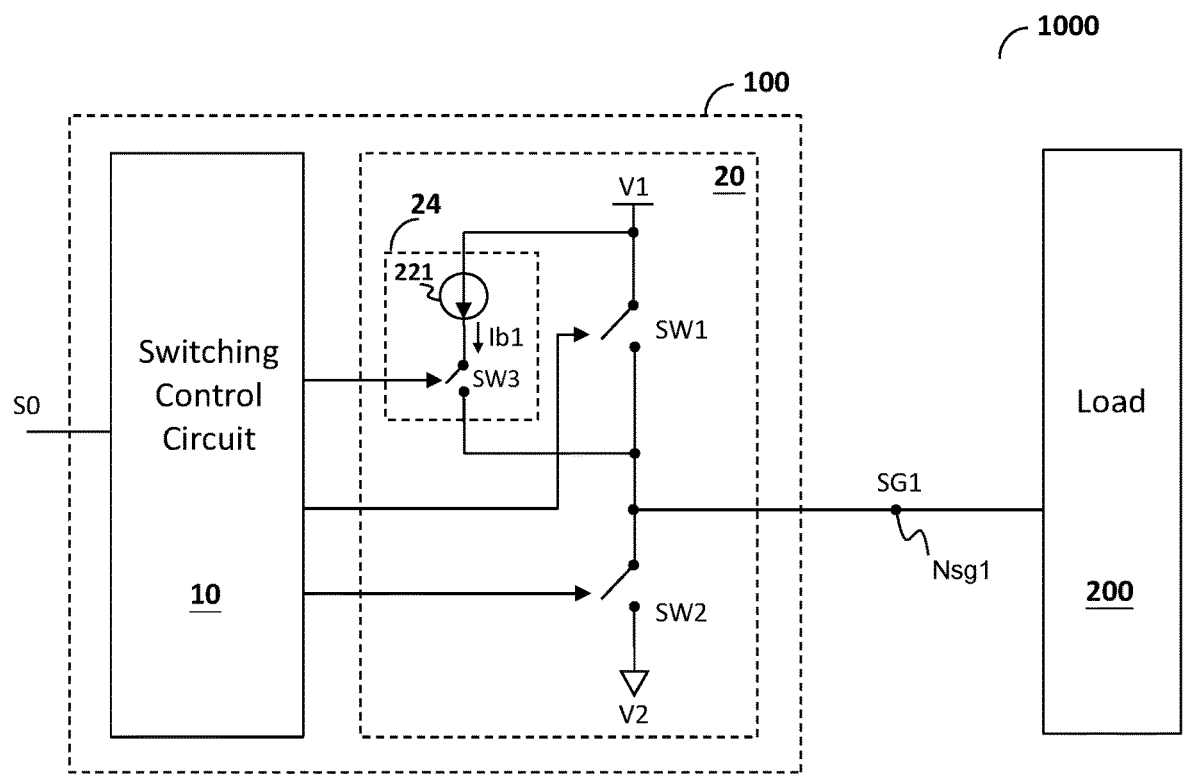
FIG. 8 shows an embodiment of a low delay time power converter circuit according to the present invention.

FIG. 8 shows an embodiment of a low delay time power converter circuit according to the present invention (power converter circuit 1008). In this embodiment, the impedance adjusting circuit 24 includes a current source 221 and a power switch SW3. The current source 221 is coupled in series with the power switch SW3 between the power source V1 and the output node Nsg1. When the power switch SW3 is conductive, there is a current Ib1 through the current source 221. Likely as in the embodiment of FIG. 6A, the power switch SW1 is turned OFF after the predetermined period T1. Because the end point of the predetermined period T1 is earlier than the time point t2, in the period (i.e. T2 as shown in FIG. 6B) from the end point of the predetermined period T1 to the time point t2, only the current source 221 and the power switch SW3 operate to maintain the level of the switching driving signal SG1. Besides, the total resistance of the current source 221 and the conductive resistance OR3 is larger than the conductive resistance OR1, so that the time point t4 when the switching driving signal SG1 switches from the high level to the low level is not restricted by the requirement of dead time, which can significantly reduce the delay time. In another aspect, the current level of the current source 221 is smaller than the current level when the power switch SW1 is conductive (at the same voltage).

Figure 9:
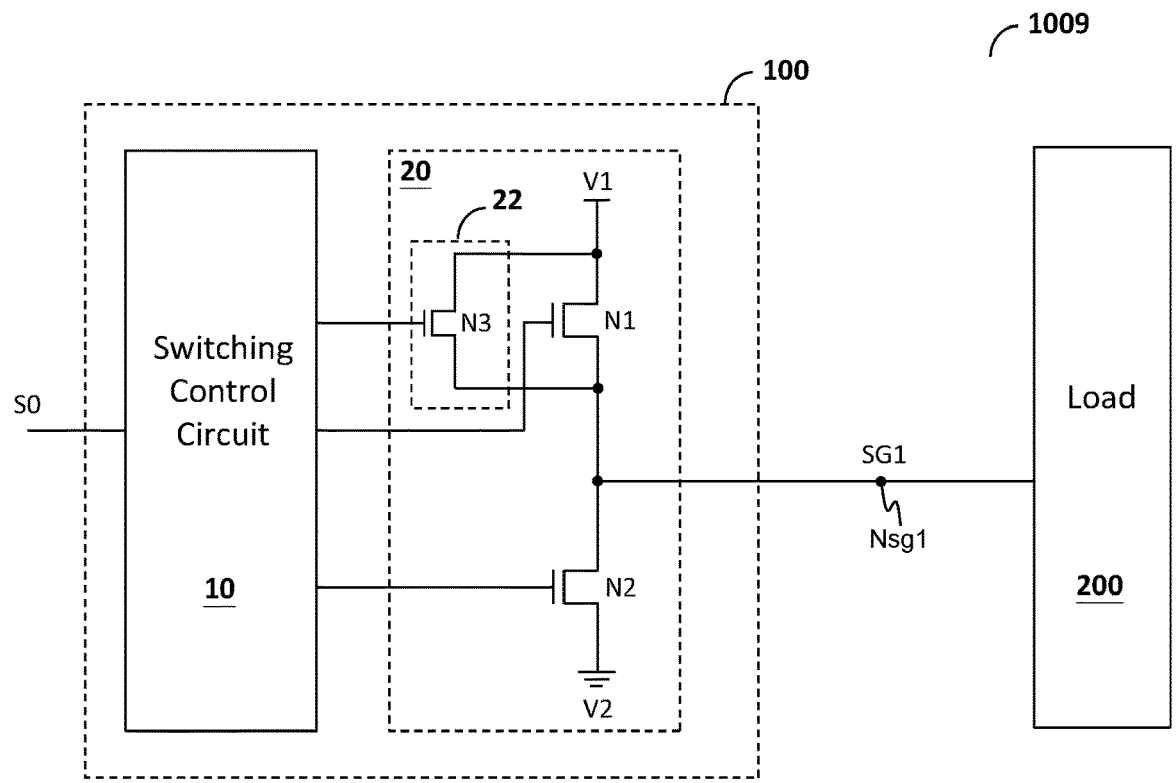
FIG. 9 shows a specific embodiment of an impedance adjusting circuit in a low delay time power converter circuit according to the present invention.

FIG. 9 shows a specific embodiment of an impedance adjusting circuit in the low delay time power converter circuit according to the present invention (power converter circuit 1009). In one embodiment, the power switch SW1, the power switch SW2 and the power switch SW3 are metal oxide semiconductor transistors having the same conductivity type. In this embodiment, the power switch SW1, the power switch SW2 and the power switch SW3 are NMOS (N-type metal oxide semiconductor) transistors (N1, N2 and N3 as shown in FIG. 9). In another embodiment, the power switch SW1, the power switch SW2 and the power switch SW3 can be PMOS transistors.

Figure 10:
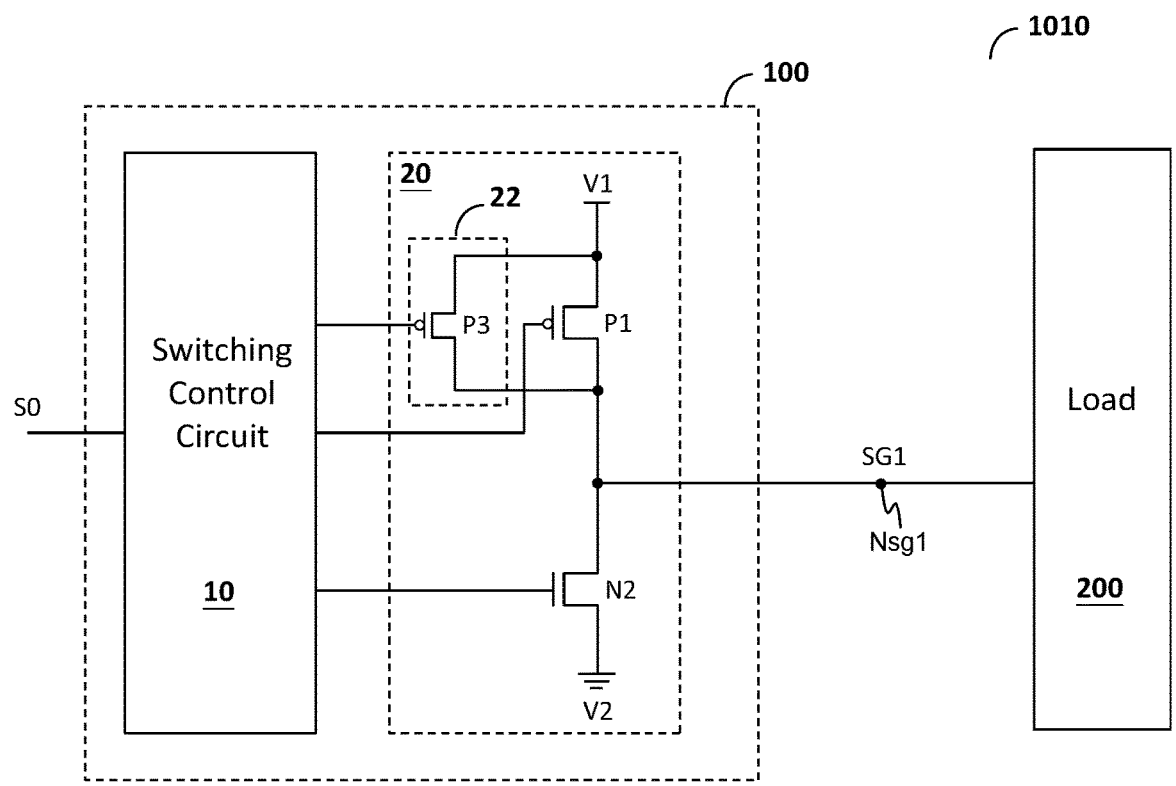
FIG. 10 shows a specific embodiment of an impedance adjusting circuit in the low delay time power converter circuit according to the present invention.

FIG. 10 shows a specific embodiment of an impedance adjusting circuit in the low delay time power converter circuit according to the present invention (power converter circuit 1010). In one embodiment, the power switch SW1, the power switch SW2 and the power switch SW3 are metal oxide semiconductor transistors having different conductivity types. In this embodiment, the power switch SW1 and the power switch SW3 are PMOS transistors (P1 and P3 as shown in FIG. 10), and the power switch SW2 is an NMOS transistor (N2 as shown in FIG. 10). In other embodiments, the power switch SW1, the power switch SW2 and the power switch SW3 can be other combinations.

Figure 11A:
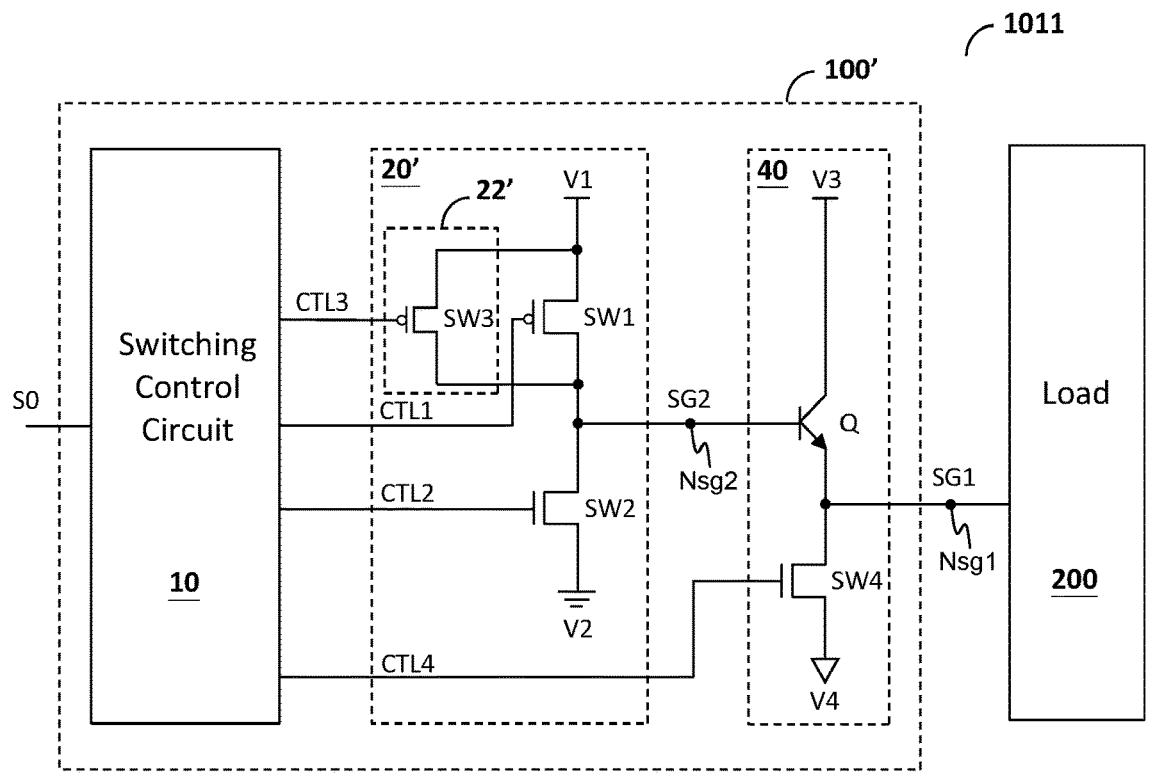
FIG. 11A shows an embodiment of a low delay time power converter circuit according to the present invention.

FIG. 11A shows an embodiment of a low delay time power converter circuit according to the present invention (power converter circuit 1011). In this embodiment, the power converter circuit 1011 includes a driver circuit 100' and a load 200.

In one embodiment, the driver circuit 100' includes the switching control circuit 10, an output stage circuit 20' and an output stage circuit 40. The output stage circuit 40 is coupled between the output stage circuit 20' and the output node Nsg1. The power switch SW1 is coupled between the power source V1 and an output node Nsg2, and the power switch SW2 is coupled between the power source V2 and the output node Nsg2. In this embodiment, the output stage circuit 20' generates a switching driving signal SG2 at the output node Nsg2 according to the switching control signal S0, and the output stage circuit 40 generates the switching driving signal SG1 at the output node Nsg1 according to the switching driving signal SG2.

In one embodiment, the output stage circuit 20' is for example corresponding to the output stage circuit 20 in FIG. 9, and an impedance adjusting circuit 22' in the output stage circuit 20' is for example corresponding to the impedance adjusting circuit 22 in FIG. 9. The details of the hardware configuration are as described as the above. In one embodiment, the output stage circuit 40 includes a bipolar junction transistor (BJT) Q and a power switch SW4. In one embodiment, a base of the BJT is coupled to the output node Nsg2, an emitter of the BJT is coupled to the output node Nsg1, and a collector of the BJT is coupled to a power source V3. In one embodiment, the power switch SW4 is coupled between the output node Nsg1 and a power source V4. The BJT generates an emitter current through the emitter according to a base current through the base, wherein the switching driving signal SG2 corresponds to the base current.

Figure 11B:
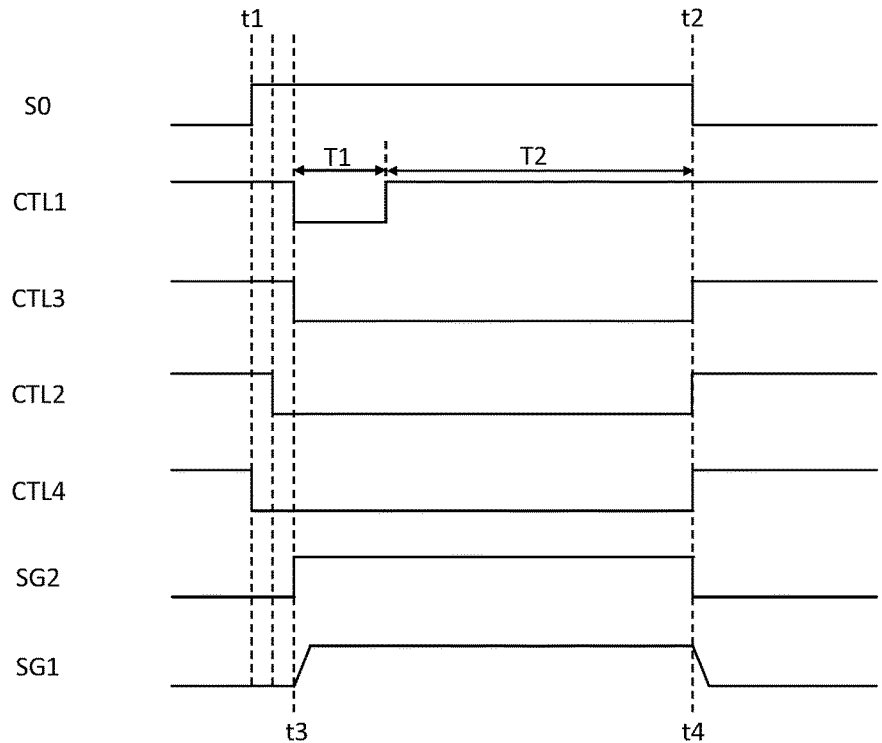
FIG. 11B shows operation waveforms corresponding to FIG. 11A.

Please refer to FIG. 11A together with FIG. 11B. FIG. 11B shows operation waveforms corresponding to FIG. 11A. In one embodiment, the power source V1 is at first voltage level and the power source V2 is at second voltage level, wherein the first voltage level is larger than the second voltage level. In another embodiment, the first voltage level can be smaller than the second voltage level. For convenience, in this embodiment, that the first voltage level is high level and the second voltage level is low level are given as an example. In one embodiment, the power source V3 is at third voltage level and the power source V4 is at fourth voltage level, wherein the third voltage level is larger than the fourth voltage level. In another embodiment, the third voltage level can be smaller than the fourth voltage level. For convenience, in this embodiment, that the third voltage level is high level and the fourth voltage level is low level are given as an example. The first voltage level can be the same as or different from the third voltage level, and the second voltage level can be the same as or different from the fourth voltage level.

As shown in FIG. 11B, when the switching control signal S0 switches at the time point t1 to control the switching driving signal SG1 to change from low level to high level, the switching control signal CTL4 and CTL2 respectively control the power switch SW4 and SW2 to turn OFF, and the switching control signal CTL1 and CTL3 respectively control the power switch SW1 and SW3 to turn ON. In the predetermined period T1 when the power switch SW1 is conductive, the BJT Q generates a large emitter current, switching the switching driving signal SG1 to the high level. After the predetermined period T1, the power switch SW1 is turned OFF. When the switching control signal S0 switches at the time point t2 to control the switching driving signal SG1 to change from high level to low level, the switching control signal CTL2 controls the power switch SW2 to turn ON, such that the switching driving signal SG1 switches to the low level.

When the switching control circuit 10 controls the power switch SW1 to be conductive, the power switch SW1 has a conductive resistance OR1. In one embodiment, the conductive resistance OR3 is larger than the conductive resistance OR1. In one embodiment, the end point of the predetermined period T1 is earlier than the time point t2. Specifically, in the period from t3 to t2, the power switch SW3 is conductive and has the conductive resistance OR3. As a result, even though the power switch SW1 is non-conductive in the period T2 of FIG. 11B, the power source V1 is still electrically connected to the output node Nsg2 by the resistance of the conductive resistance OR3 (which is larger than the conductive resistance OR1), such that there is a small emitter current through the emitter of the BJT Q, whereby the switching driving signal SG1 keeps at the high level.

Figure 2A:
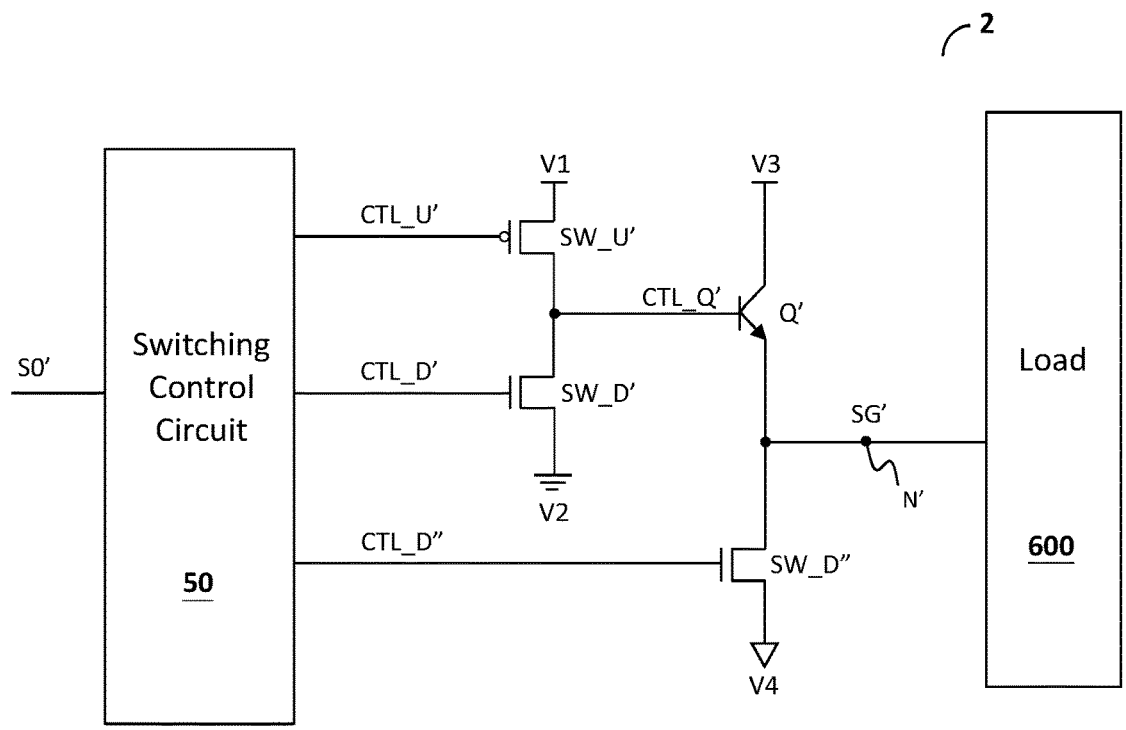
FIG. 2A shows another prior art power converter circuit.
Figure 2B:
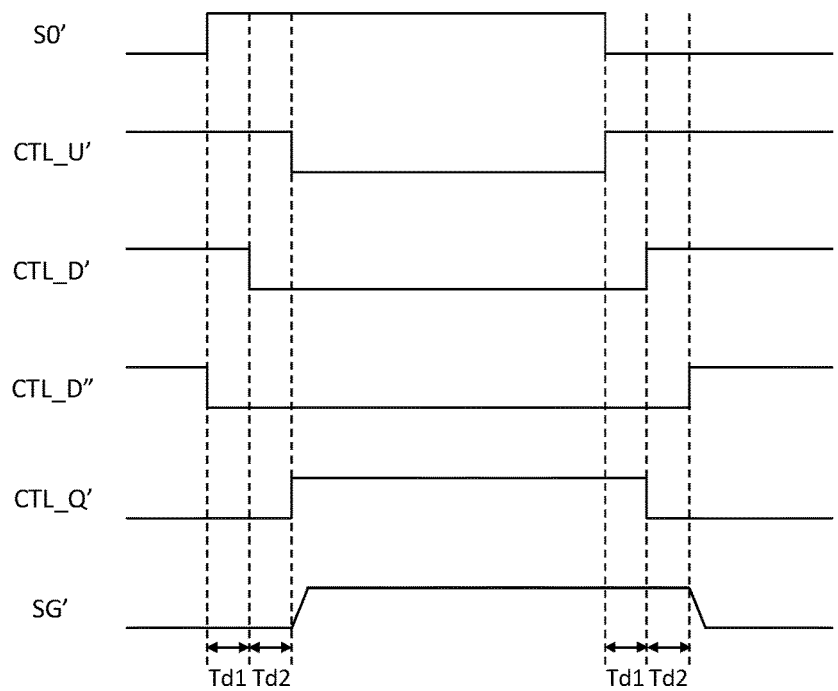
FIG. 2B shows operation waveforms corresponding to FIG. 2A.

Please note that, according to the present invention, because the end point of the predetermined period T1 is earlier than the time point t2, in the period (i.e. T2 as shown in FIG. 11B) from the end point of the predetermined period T1 to the time point t2, only the power switch SW3 operates to maintain the level of the switching driving signal SG1. Besides, the conductive resistance OR3 is larger than the conductive resistance OR1, so that the time point t4 when the switching driving signal SG1 switches from the high level to the low level is not restricted by the requirement of dead time (e.g. Td1 and Td2 as shown in FIG. 2B), which can significantly reduce the delay time between the switching of the switching control signal S0 and the switching of the switching driving signal SG1. In one preferred embodiment, the delay time is zero. That is, when the switching control signal S0 switches at the time point t2 to control the switching driving signal SG1 to the low level, the switching driving signal SG1 can start switching to the low level immediately without any delay.

For example, near the time point t2, although the power switch SW3, SW2, SW4 and the BJT Q are all conductive, the conductive resistance OR3 can limit a shoot-through current between the power switch SW3 and the power switch SW2, which limits the base current and the emitter current of the BJT Q. As a result, when the switching control signal S0 switches at the time point t2, the power switch SW4 can be turned ON immediately without requiring waiting for a dead time, so that the delay time between the switching control signal S0 and the switching driving signal SG1 can be significantly reduced.

Still referring to FIG. 11A, in this embodiment, the power switch SW1 and the power switch SW3 are PMOS transistors, while the power switch SW2 and the power switch SW4 are NMOS transistors. In other embodiments, the power switch SW1, SW2, SW3 and SW4 can be other combinations of PMOS and/or NMOS transistors.

Figure 12A:
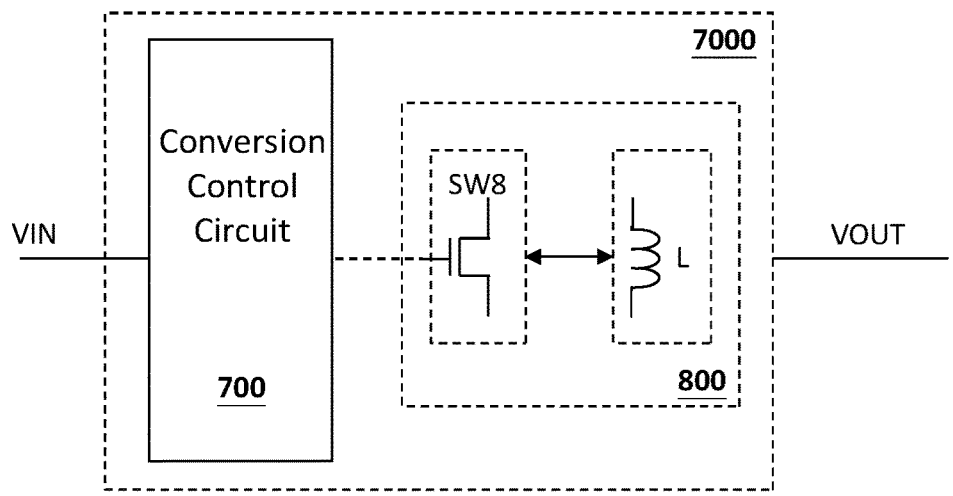
FIG. 12A shows an embodiment that a low delay time power converter circuit according to the present invention is configured as a switching power supply circuit.

FIG. 12A shows an embodiment that a low delay time power converter circuit according to the present invention is configured as a switching power supply circuit (switching power supply circuit 7000). The switching power supply circuit is configured to operably convert an input voltage VIN to an output voltage VOUT. In this embodiment, the switching power supply circuit 7000 includes a conversion control circuit 700 and a power stage circuit 800 (which at least includes an inductor L and a conversion switch SW8). In one embodiment, the conversion switch SW8 of the power stage circuit 800 is configured to operably control the inductor L to convert the input voltage VIN to the output voltage VOUT. In this embodiment, the conversion control circuit 700 corresponds to the above-mentioned driver circuit of the present invention, and the conversion switch SW8 corresponds to the above-mentioned load of the present invention.

Figure 12B:
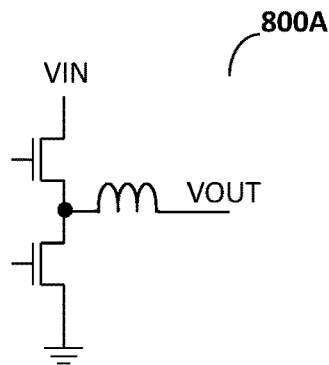
FIGS. 12B-12D show several embodiments of a power stage circuit when a low delay time power converter circuit according to the present invention is implemented as a switching power supply circuit.
Figure 12C:
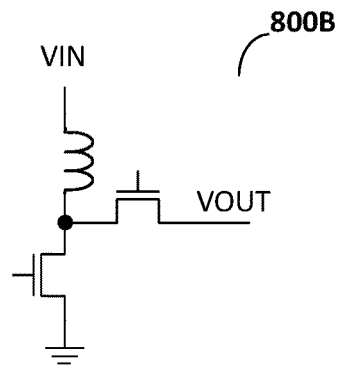
Figure 12D:
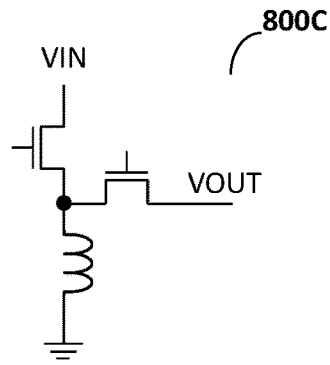

Please refer to FIGS. 12B-12D, which show several embodiments of a power stage circuit (i.e., power stage circuits 800A to 800C) when a low delay time power converter circuit according to the present invention is implemented as a switching power supply circuit. It should be understood that the implementations of the power stage circuit as the power stage circuits 800A to 800C shown in FIGS. 12B-12D are only illustrative examples, but not for limiting the scope of the present invention. The power stage circuit (which corresponds to the power stage circuit 800 as shown in FIG. 12A) can be implemented as one of the following: a buck switching power stage (as shown by the power stage circuit 800A in FIG. 12B); a boost switching power stage (as shown by the power stage circuit 800B in FIG. 12C); or a buck-boost switching power stage (as shown by the power stage circuit 800C in FIG. 12D). And, the above-mentioned power switch SW8 can correspond to any one of the power switches in the power stage circuits 800A to 800C, whereas, the above-mentioned inductor L can correspond to the inductor in the power stage circuits 800A to 800C.

Figure 13:
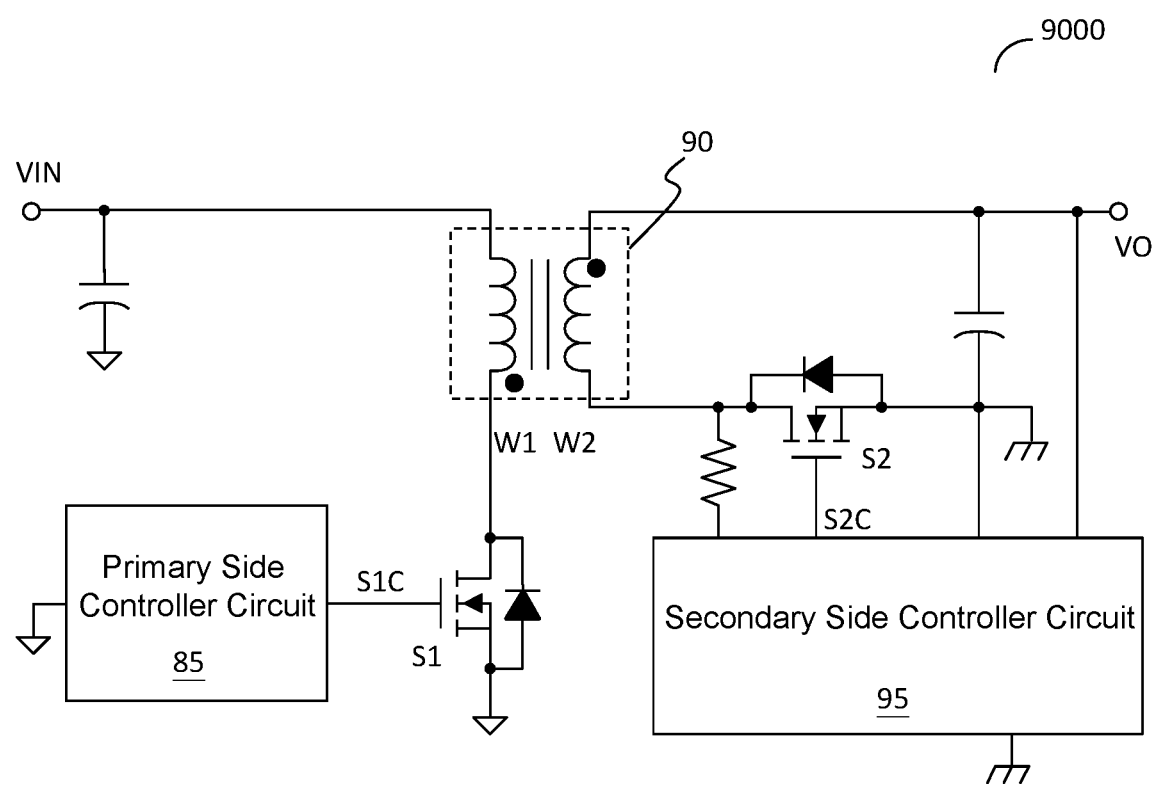
FIG. 13 shows an embodiment that a low delay time power converter circuit according to the present invention is configured as a flyback power supply circuit.

FIG. 13 shows an embodiment that a low delay time power converter circuit according to the present invention is configured as a flyback power supply circuit (flyback power converter 9000). The flyback power converter 9000 is configured to operably convert an input voltage VIN to an output voltage VOUT. In this embodiment, the flyback power converter 9000 includes a power transformer 90, a primary side switch S1, a synchronous rectification switch S2, a primary side controller circuit 85 and a secondary side controller circuit 95. The power transformer 90 is coupled between the input voltage VIN and the output voltage VOUT. The primary side switch S1 is coupled to a primary side winding W1 of the power transformer 90, wherein the primary side winding W1 is coupled to the input voltage VIN. The synchronous rectification switch S2 is coupled to a second side winding W2 of the power transformer 90. The primary side controller circuit 85 is configured to operably generate a switching signal S1C to control the primary side switch S1 to operate the primary side winding W1 of the power transformer 90. The secondary side controller circuit 95 is configured to operably generate a synchronous rectification control signal S2C to control the synchronous rectification switch S2 to operate the secondary side winding W2 of the power transformer 90 to generate the output voltage VOUT.

Please refer to FIG. 3A together with FIG. 13. The driver circuit in FIG. 3A is configured as one of the following: (1) the switching driving signal SG1 corresponds to the switching signal S1C, the driver circuit 100 corresponds to the primary side controller circuit 85 (or its interior driver circuit), and the load 200 corresponds to the primary side switch S1; or (2) the switching driving signal SG1 corresponds to the synchronous rectification control signal S2C, the driver circuit 100 corresponds to the secondary side controller circuit 95 (or its interior driver circuit), and the load 200 corresponds to the synchronous rectification switch S2.

Figure 14:
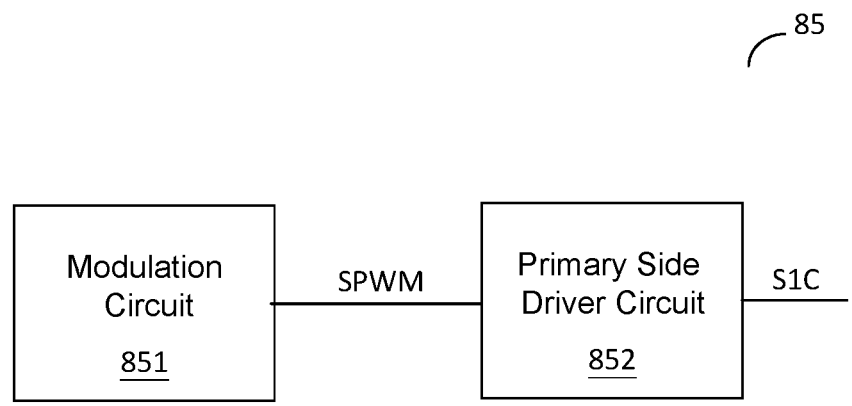
FIG. 14 shows an embodiment of a primary side controller circuit when a low delay time power converter circuit according to the present invention is implemented as a flyback power converter.
Figure 15:
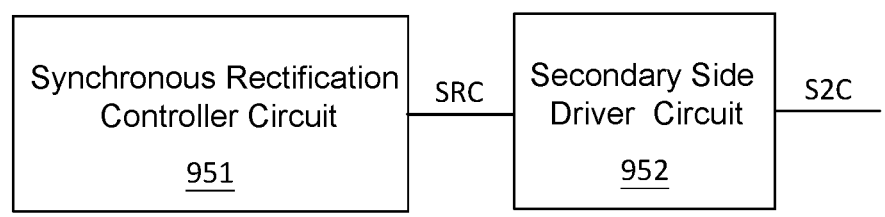
FIG. 15 shows an embodiment of a secondary side controller circuit when a low delay time power converter circuit according to the present invention is implemented as a flyback power converter.

Please refer to FIG. 14 together with FIG. 15. FIG. 14 shows an embodiment of a primary side controller circuit (primary side controller circuit 85) when a low delay time power converter circuit according to the present invention is implemented as a flyback power converter. FIG. 15 shows an embodiment of a secondary side controller circuit (secondary side controller circuit 95) when a low delay time power converter circuit according to the present invention is implemented as a flyback power converter. In one embodiment, as shown in FIG. 14, the primary side controller circuit 85 includes a modulation circuit 851 and a primary side driver circuit 852. In one embodiment, the above-mentioned switching control signal S0 for example corresponds to a PWM control signal SPWM which is generated by the modulation circuit 851 for controlling the primary side switch S1; the above-mentioned driver circuit 100 corresponds to the primary side driver circuit 852 which generates the switching signal S1C (corresponding to the switching driving signal SG1) according to the PWM control signal SPWM. In another embodiment, as shown in FIG. 15, the secondary side controller circuit 95 includes a synchronous rectification controller circuit 951 and a secondary side driver circuit 952. In one embodiment, the above-mentioned switching control signal S0 for example corresponds to a synchronous control signal SRC which is generated by the synchronous rectification controller circuit 951 according to a current of the secondary side or a voltage of the synchronous rectification switch S2, for controlling the synchronous rectification switch S2; the above-mentioned driver circuit 100 corresponds to the secondary side driver circuit 952 which generates the synchronous rectification control signal S2C (corresponding to the switching driving signal SG1) according to the synchronous control signal SRC.

In some applications, power switches in the power converter circuits especially need fast switching to reduce power consumption or to effectively protect the circuit. For example, in the flyback power converter 9000 of FIG. 13, when the secondary side controller circuit 95 determines that it is required to turn OFF the synchronous rectification switch S2 by detecting the current of the synchronous rectification switch S2 (e.g. corresponding to t2), the delay time should be as short as possible to avoid additional power consumption due to that the primary side switch S1 and the synchronous rectification switch S2 are conductive at the same time. For another example, when certain abnormal conditions occur in the flyback power converter 9000 (e.g. over voltage or over current), it is required to turn OFF the primary side switch S1 and the synchronous rectification switch S2 to avoid damaging the circuit, and this should be as fast as possible. According to the present invention, as mentioned above, when the switching control signal S0 switches to control the switching driving signal SG1 to change to the low level, the switching driving signal SG1 can start switching to the low level immediately without any delay, which can effectively achieve the fast switching requirement described above.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A low delay time power converter circuit, comprising:
    a driver circuit, including a switching control circuit and a first output stage circuit, wherein the switching control circuit is configured to operably control the first output stage circuit according to a switching control signal to generate a first switching driving signal at a first output node, wherein the first output stage circuit includes:
    a first power switch, coupled between a first power source and the first output node, wherein when the switching control signal switches at a first time point to control the first switching driving signal to change to a first voltage level, the switching control circuit turns ON the first power switch, such that the first switching driving signal switches to the first voltage level, and thereafter the first power switch is turned OFF at a time point after a predetermined period from when the first power switch is turned ON, wherein the first power switch has a first conductive resistance when conductive;
    a second power switch, coupled between a second power source and the first output node, wherein when the switching control signal switches at a second time point to control the first switching driving signal to change to a second voltage level, the switching control circuit turns ON the second power switch, such that the first switching driving
signal switches to the second voltage level; and
an impedance adjusting circuit, connected to the first
power switch in parallel, wherein when the first
switching driving signal is at the first voltage level,
the impedance adjusting circuit has a resistance;
wherein the time point when the first power switch is
turned OFF is earlier than the second time point, and
wherein the resistance of the impedance adjusting
circuit is larger than the first conductive resistance;
and
a load, controlled by the first switching driving signal to
operate.

2. The low delay time power converter circuit of claim 1, wherein the impedance adjusting circuit includes a first resistor which is coupled between the first power source and the first output node, wherein a resistance of the first resistor is larger than the first conductive resistance.

3. The low delay time power converter circuit of claim 1, wherein the switching control circuit is configured to operably control the impedance adjusting circuit, wherein at the first time point, the switching control circuit controls the impedance adjusting circuit to adjust the first switching driving signal, such that the first switching driving signal switches to the first voltage level, and when the first power switch is turned OFF, the impedance adjusting circuit maintains the first switching driving signal at the first voltage level, and thereafter at the second time point, the switching control circuit controls the impedance adjusting circuit to stop adjusting the first switching driving signal.

4. The low delay time power converter circuit of claim 1, wherein the first power source has the first voltage level, and the second power source has the second voltage level.

5. The low delay time power converter circuit of claim 3, wherein the impedance adjusting circuit includes a third power switch which is coupled between the first power source and the first output node, wherein during a period when the switching control signal controls the first switching driving signal at the first voltage level, the switching control signal turns ON the third power switch, and during a period when the switching control signal controls the first switching driving signal at the second voltage level, the switching control signal turns OFF the third power switch; wherein the third power switch has a third conductive resistance when conductive, wherein the third conductive resistance is larger than the first conductive resistance.

6. The low delay time power converter circuit of claim 5, wherein the impedance adjusting circuit further includes:
a second resistor, coupled in series with the third power switch between the first power source and the first output node, wherein a resistance of the second resistor is larger than the first conductive resistance; or
a current source, coupled in series with the third power switch between the first power source and the first output node, wherein a current level generated by the current source is smaller than a current level through the first power switch.

7. The low delay time power converter circuit of claim 5, wherein the first power switch, the second power switch and the third power switch are NMOS (N-type metal oxide semiconductor) transistors.

8. The low delay time power converter circuit of claim 5, wherein the first power switch and the third power switch are PMOS (P-type metal oxide semiconductor) transistors, and the second power switch is an NMOS transistor.

9. The low delay time power converter circuit of claim 5, wherein the driver circuit further includes a second output stage circuit which is coupled between the first output stage circuit and the first output node, wherein the first output stage circuit generates a second switching driving signal at a second output node according to the switching control signal, wherein the first power switch is coupled between the first power source and the second output node, and the second power switch is coupled between the second power source and the second output node, wherein the second output stage circuit generates the first switching driving signal at the first output node according to the second switching driving signal, wherein the second output stage circuit includes:
a bipolar junction transistor (BJT), wherein a base of the BJT is coupled to the second output node, an emitter of the BJT is coupled to the first output node, and a collector of the BJT is coupled to a third power source, wherein the BJT generates an emitter current through the emitter according to a base current through the base, wherein the second switching driving signal corresponds to the base current, wherein the emitter current is at a first current level when the first power switch is conductive, and the emitter current is at a second current level when the first power switch is non-conductive and the third power switch is conductive, wherein the second current level is smaller than the first current level, wherein when the switching control signal switches at the first time point to control the first switching driving signal to change to the first voltage level, the second switching driving signal turns ON the BJT, such that the first switching driving signal switches to the first voltage level; and
a fourth power switch, coupled between the first output node and a fourth power source, wherein when the switching control signal switches at the second time point to control the first switching driving signal to change to the second voltage level, the switching control circuit turns ON the fourth power switch, such that the first switching driving signal switches to the second voltage level.

10. The low delay time power converter circuit of claim 9, wherein the first power switch, the second power switch and the third power switch are NMOS transistor.

11. The low delay time power converter circuit of claim 9, wherein the first power switch and the third power switch are PMOS transistor, and the second power switch is an NMOS transistor.

12. The low delay time power converter circuit of claim 11, wherein the fourth power switch is an NMOS transistor.

13. The low delay time power converter circuit of claim 9, wherein the third power source has the first voltage level and the fourth power source has the second voltage level.

14. The low delay time power converter circuit of claim 1, wherein the first voltage level is larger than the second voltage level.

15. The low delay time power converter circuit of claim 1, wherein the first voltage level is smaller than the second voltage level.

16. The low delay time power converter circuit of claim 1, wherein the low delay time power converter circuit is configured as a switching power supply circuit, wherein the switching power supply circuit is configured to operably convert an input voltage to an output voltage, wherein the switching power supply circuit includes:
an inductor;
a conversion switch, configured to operably control the inductor to convert the input voltage to the output voltage; and a conversion control circuit, configured to operably control the conversion switch;
wherein the driver circuit corresponds to the conversion control circuit, and the load corresponds to the conversion switch.

17. The low delay time power converter circuit of claim 1, wherein the low delay time power converter circuit is configured as a flyback power converter, wherein the flyback power converter is configured to operably convert an input voltage to an output voltage, wherein the flyback power converter includes:
a power transformer, coupled between the input voltage and the output voltage;
a primary side switch, coupled to a primary side winding of the power transformer, wherein the primary side winding is coupled to the input voltage;
a synchronous rectification switch, coupled to a second side winding of the power transformer;
a primary side controller circuit, configured to operably generate a switching signal to control the primary side switch to operate the primary side winding of the power transformer; and
a secondary side controller circuit, configured to operably generate a synchronous rectification control signal to control the synchronous rectification switch to operate the secondary side winding of the power transformer to generate the output voltage;
wherein the driver circuit is configured as one of the following:
(1) wherein the first switching driving signal corresponds to the switching signal, the driver circuit corresponds to the primary side controller circuit, and the load corresponds to the primary side switch; or
(2) wherein the first switching driving signal corresponds to the synchronous rectification control signal, the driver circuit corresponds to the secondary side controller circuit, and the load corresponds to the synchronous rectification switch.

18. A driver circuit configured to operably drive a load, comprising:
a first output stage circuit; and
a switching control circuit, configured to operably control the first output stage circuit according to a switching control signal to generate a first switching driving signal at a first output node;
wherein the first output stage circuit includes:
a first power switch, coupled between a first power source and the first output node, wherein when the switching control signal switches at a first time point to control the first switching driving signal to change to a first voltage level, the switching control circuit turns ON the first power switch, such that the first switching driving signal switches to the first voltage level, and thereafter the first power switch is turned OFF at a time point after a predetermined period from when the first power switch is turned ON, wherein the first power switch has a first conductive resistance when conductive;
a second power switch, coupled between a second power source and the first output node, wherein when the switching control signal switches at a second time point to control the first switching driving signal to change to a second voltage level, the switching control circuit turns ON the second power switch, such that the first switching driving signal switches to the second voltage level; and
an impedance adjusting circuit, connected to the first power switch in parallel, wherein when the first switching driving signal is at the first voltage level, the impedance adjusting circuit has a resistance;
wherein the time point when the first power switch is turned OFF is earlier than the second time point, and wherein the resistance of the impedance adjusting circuit is larger than the first conductive resistance.

19. The driver circuit of claim 18, wherein the impedance adjusting circuit includes a first resistor which is coupled between the first power source and the first output node, wherein a resistance of the first resistor is larger than the first conductive resistance.

20. The driver circuit of claim 18, wherein the switching control circuit is configured to operably control the impedance adjusting circuit, wherein at the first time point, the switching control circuit controls the impedance adjusting circuit to adjust the first switching driving signal, such that the first switching driving signal switches to the first voltage level, and when the first power switch is turned OFF, the impedance adjusting circuit maintains the first switching driving signal at the first voltage level, and thereafter at the second time point, the switching control circuit controls the impedance adjusting circuit to stop adjusting the first switching driving signal.

21. The driver circuit of claim 18, wherein the first power source has the first voltage level, and the second power source has the second voltage level.

22. The driver circuit of claim 20, wherein the impedance adjusting circuit includes a third power switch which is coupled between the first power source and the first output node, wherein during a period when the switching control signal controls the first switching driving signal at the first voltage level, the switching control signal turns ON the third power switch, and during a period when the switching control signal controls the first switching driving signal at the second voltage level, the switching control signal turns OFF the third power switch; wherein the third power switch has a third conductive resistance when conductive, wherein the third conductive resistance is larger than the first conductive resistance.

23. The driver circuit of claim 22, wherein the impedance adjusting circuit further includes:
a second resistor, coupled in series with the third power switch between the first power source and the first output node, wherein a resistance of the second resistor is larger than the first conductive resistance; or
a current source, coupled in series with the third power switch between the first power source and the first output node, wherein a current level generated by the current source is smaller than a current level through the first power switch.

24. The driver circuit of claim 22, wherein the first power switch, the second power switch and the third power switch are NMOS (N-type metal oxide semiconductor) transistors.

25. The driver circuit of claim 22, wherein the first power switch and the third power switch are PMOS (P-type metal oxide semiconductor) transistors, and the second power switch is an NMOS transistor.

26. The driver circuit of claim 22, further comprising a second output stage circuit which is coupled between the first output stage circuit and the first output node, wherein the first output stage circuit generates a second switching driving signal at a second output node according to the switching control signal, wherein the first power switch is coupled between the first power source and the second output node, and the second power switch is coupled between the second power source and the second output node, wherein the second output stage circuit generates the first switching driving signal at the first output node according to the second switching driving signal, wherein the second output stage circuit includes:

a bipolar junction transistor (BJT), wherein a base of the BJT is coupled to the second output node, an emitter of the BJT is coupled to the first output node, and a collector of the BJT is coupled to a third power source, wherein the BJT generates an emitter current through the emitter according to a base current through the base, wherein the second switching driving signal corresponds to the base current, wherein the emitter current is at a first current level when the first power switch is conductive, and the emitter current is at a second current level when the first power switch is non-conductive and the third power switch is conductive, wherein the second current level is smaller than the first current level, wherein when the switching control signal switches at the first time point to control the first switching driving signal to change to the first voltage level, the second switching driving signal turns ON the BJT, such that the first switching driving signal switches to the first voltage level; and a fourth power switch, coupled between the first output node and a fourth power source, wherein when the switching control signal switches at the second time point to control the first switching driving signal to change to the second voltage level, the switching control circuit turns ON the fourth power switch, such that the first switching driving signal switches to the second voltage level.

27. The driver circuit of claim 26, wherein the first power switch, the second power switch and the third power switch are NMOS transistor.

28. The driver circuit of claim 26, wherein the first power switch and the third power switch are PMOS transistor, and the second power switch is an NMOS transistor.

29. The driver circuit of claim 28, wherein the fourth power switch is an NMOS transistor.

30. The driver circuit of claim 26, wherein the third power source has the first voltage level and the fourth power source has the second voltage level.

31. The driver circuit of claim 18, wherein the first voltage level is larger than the second voltage level.

32. The driver circuit of claim 18, wherein the first voltage level is smaller than the second voltage level.

* * * * *